UNITED STATES PATENT OFFICE.

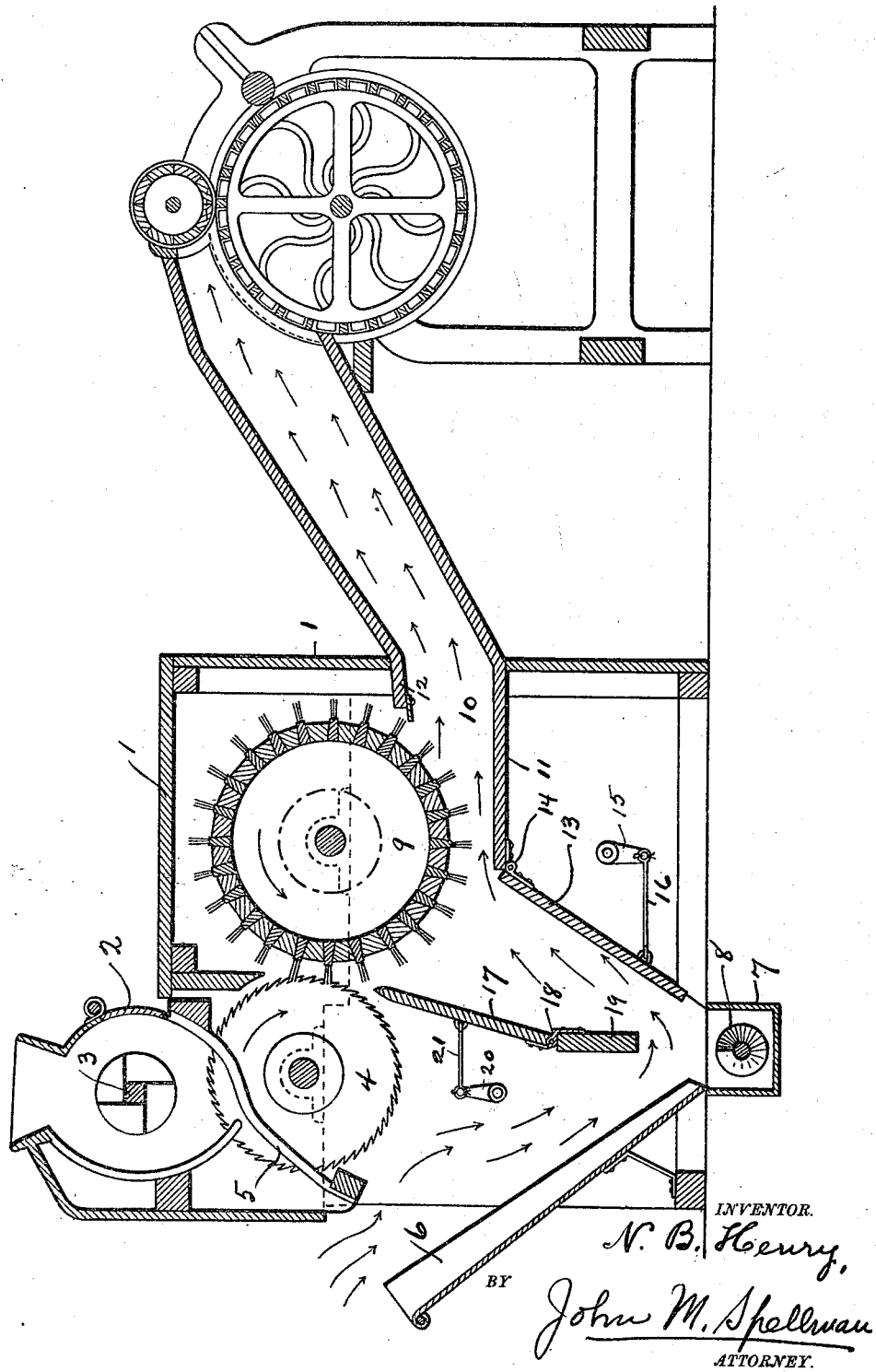

NELSON B. HENRY, OF ATLANTA, GEORGIA, ASSIGNOR TO THE MURRAY COMPANY, OF DALLAS, TEXAS, A CORPORATION OF TEXAS.

COTTON-SEED LINTER.

1,276,355.     Specification of Letters Patent.     Patented Aug. 20, 1918.

Application filed December 26, 1916. Serial No. 138,984.

*To all whom it may concern:*

Be it known that I, NELSON B. HENRY, a citizen of the United States, residing at Atlanta, in the county of Fulton and State of Georgia, have invented certain new and useful Improvements in Cotton-Seed Linters, of which the following is a specification.

My invention has relation to an improvement in cotton seed linters and in such connection it relates more particularly to the arrangement and construction of the parts of the linter whereby the lint is freed from motes, trash or the like prior to its entrance into the lint conveying flue.

In the usual form of linter the seed from a gin is introduced into a roll box and agitated by a float. The seed is thus presented to the usual saw cylinder, working through ribs, the saw cylinder catching up or picking off the lint from the seed and the ribs conducting the seed so freed to a chute and conveyer. The lint in the saw teeth is removed by a brush revolving in a direction opposite to that in which the saw cylinder revolves and the bristles of the brush sweep over the periphery of the saw cylinder to discharge the lint vertically and tangentially away from the saws. In theory the rapidly revolving brush creates or sets up a current of air designed to catch the lint particles as they leave the saws and to carry said particles horizontally into the lint flue. In practice however it has been heretofore extremely difficult if not impossible to regulate the strength of this air current so that on the one hand a portion of the lint is prevented from following the trash, etc., in a vertical direction into the seed conveyer and, on the other hand, the lint and the lint only may be conveyed to the flue, the air current not being strong enough to catch up and convey away the vertically moving particles of trash, etc., to said flue.

It is the main object of my invention to provide means in a linter for regulating the strength and the direction of the air current set up by the revolving brush whereby the lint and the lint only is conveyed to the lint flue and the trash, motes and dirt freed from the lint are permitted by their weight to descend to the seed conveyer unaccompanied by particles of lint.

In the carrying out of my invention the casing which incloses the saw cylinder and brush and from which the lint flue leads, is provided with means dividing the space below the saws and brush cylinder into a sinuous channel, through which, when the brush revolves, air is drawn in a sinuous path from in front of the saws downward over the discharge to the seed conveyer and then upwardly below the brush into the lint flue. An adjustable board which may be called a mote board serves when moved to decrease or increase the area of the passage over the seed conveyer and to thus decrease or increase the strength of the air current passing upward below the brush toward the lint flue. The means dividing the chamber into a sinuous passageway, by preference, consists of an adjustable parting board projecting upward to a point between the periphery of the saw cylinder and the brush cylinder to constitute an effective means for separating the heavier particles such as immature seed from the lint and motes at the point where the brush takes off the lint from the teeth of the saws.

The nature and scope of my invention will be more fully understood from the following description taken in conjunction with the accompanying drawing forming part hereof and which illustrates in section a delinting machine embodying the main features of my invention.

Referring to said drawing, 1 represents the casing of the linter set upon a floor or platform which casing is closed at the top and rear or brush end of the machine during the operation of said machine. At the top of the front end of the casing 1 is arranged the roll box 2 into which the seed to be delinted is fed and in this box 2 rotates the float 3 for agitating the seed and properly presenting the same to the saws 4 and ribs 5 arranged below the roll box 2 and within said casing. The seed is conveyed along the ribs 5 after being presented to the saws 4 and is discharged into the inclined chute 6 which conducts the seed to a trough 7 in which revolves a screw conveyer 8. To the rear of the saws 4 is arranged the revolving brush cylinder 9 the cylinder 9 revolving in a direction opposite to that in which the saws 4 revolve and at a much higher speed. The bristles of the cylinder 9 sweep across the periphery of each of the saws to disengage the lint caught up by said saws after passing through the seed in box 2.

So far as described the construction is substantially the same as in an ordinary delinting machine.

The lint flue 10 is connected to the rear of the casing 1 and terminates at its base at a point below the doffing brush cylinder 9 and slightly in front of the axis of said cylinder 9. The lower wall 11 of the portion of flue 10 which extends into the interior of the machine is relatively close to the periphery of said cylinder as also the upper wall 12 of said flue 10, the arrangement being such that to all intents and purposes the brush cylinder in revolving sweeps across the inlet to flue 10 and delivers the air generated by the revolution of the brush cylinder into said flue.

From the lower wall 11 of the flue depends a movable board 13, said board being hinged as at 14 to the wall 11 of the flue and extending diagonally downward from said flue to the trough 7. The board 13 although it may be regarded as a mote board performs several other functions one of which is to form the rear wall of a V shaped chamber arranged below the brush and saw cylinders, the front wall of said chamber being constituted by the seed chute 6.

The board 13 is provided with means for moving it forward or backward on its hinge 14 one form of such means consisting of a crank arm 15 connected by link 16 to the board at or near its free end.

The V shaped chamber thus formed is divided longitudinally by a partition 17 in the nature of a parting board. This partition 17 is hinged or pivoted at its lower end as at 18 to the longitudinal beam 19 which is fixed in the casing some distance above the trough 7. The upper end of the parting board or partition 17 extends upward between the contiguous portions of the periphery of the saw and brush cylinders. One of its functions is to separate the heavier particles, immature seed, etc., from the lighter particles, motes, dirt and trash, during the lint removing operation. The second of the functions of this partition 17 is to prevent air from passing from the front of the casing at the top of the seed chute 6 directly across the chamber below the saw and brush cylinders into the lint flue 10, the partition 17 with the beam 19 dividing the chamber into two compartments which communicate directly only at the bottom of the beam 19 and between said beam and the trough 7. The partition 17 is movable toward or away from the saw cylinder by means of crank arm 20 and link 21 to take up in one instance for the wear and tear on the saws and in the other instance to accommodate for the replacement of an old saw cylinder by a new one. The third function of the board 13 is to regulate the amount of air passing below the beam 19 and this function is accomplished by moving the free end of the board toward or away from the under surface of said beam 19 to thereby obstruct contract or expand the passageway below the beam.

Inasmuch as the revolving brush cylinder creates a suction in the rear compartment of the chamber below the saw and brush cylinders, air will rush into the forward compartment and be deflected to the opening or passageway under beam 19. The air current thus created passes upward in the rear compartment and is discharged into the flue 10. The air is thus compelled by the partition 17 to take a sinuous course through the chamber and the force of the current in the rear compartment can be and is regulated by the movement or adjustment of the mote board 13 which constitutes the rear wall of the chamber. If now it is found that the current of air passing through the rear compartment is too strong to permit the particles of dirt to separate from the lint and to drop vertically into the trough 7, the rear wall of the chamber, *i. e.* the mote board 13, is moved toward the beam to close the passageway under the beam more or less as required. If however the air current through the rear compartment is too weak to carry off the lint into the flue, then said board 13 is moved away from the beam to widen said passageway and permit of a more or less increase in the strength of said air current.

Having thus described the nature and objects of my invention what I claim as new and desire to secure by Letters Patent, is—

1. In a cotton gin having a saw cylinder, a doffing brush inclosed in a casing and a lint flue, said casing having an opening therein opposite the lint flue permitting the entrance of an air current, a chamber in the lower part of the casing through which said air current passes to the flue, a conveyer at the bottom of said chamber, a seed chute leading to the conveyer above which chute said air current passes and means causing a sharp bend in said current directly above and close to said conveyer.

2. In a cotton gin having a saw cylinder, a doffing brush inclosed in a casing and a lint flue, said casing having an opening therein opposite the lint flue permitting the entrance of an air current, a chamber in the lower part of the casing through which said air current passes to the flue, a conveyer at the bottom of said chamber, a seed chute leading to the conveyer above which chute said air current passes and a parting board arranged directly above and close to said conveyer and arranged to cause a sharp bend in said air current directly above and in proximity to the conveyer.

3. In a cotton gin having a saw cylinder, a doffing brush inclosed in a casing and a lint flue, said casing having an opening therein opposite the lint flue permitting the entrance of an air current, a chamber in the lower part of the casing through which said air current passes to the flue, a conveyer at the bottom of said chamber, a seed chute leading to the conveyer above which chute said air current passes and a beam arranged directly above and close to said conveyer and an adjustable partition extending from the beam to a point nearly between the point of contact between the saw and brush, said beam and adjustable partition constituting a means for causing a sharp bend in the air current directly above and close to said conveyer.

4. In a cotton gin having a saw cylinder, a doffing brush inclosed in a casing and a lint flue, said casing having an opening therein opposite the lint flue permitting the entrance of an air current, a chamber in the lower part of the casing through which said air current passes to the flue, a conveyer at the bottom of said chamber, a seed chute leading to the conveyer above which chute said air current passes and a parting board arranged directly above and close to said conveyer and arranged to cause a sharp bend in said air current directly above and in proximity to the conveyer, a board depending downward from the lower wall of the flue to the conveyer and means for moving the board toward or away from the parting board to thereby regulate the volume of air passing below said parting board.

In testimony whereof I have signed my name to this specification in the presence of two subscribing witnesses.

NELSON B. HENRY.

Witnesses:
W. D. ELLIS, Jr.,
C. F. SEEGER.

Copies of this patent may be obtained for five cents each, by addressing the "Commissioner of Patents, Washington, D. C."